No. 711,333. Patented Oct. 14, 1902.
G. MITCHELL & L. D. COPELAND.
PROCESS OF GENERATING STEAM FROM HOT SLAG, &c.
(Application filed June 14, 1902.)
(No Model.) 4 Sheets—Sheet 2.

No. 711,333. Patented Oct. 14, 1902.
G. MITCHELL & L. D. COPELAND.
PROCESS OF GENERATING STEAM FROM HOT SLAG, &c.
(Application filed June 14, 1902.)
(No Model.) 4 Sheets—Sheet 3.
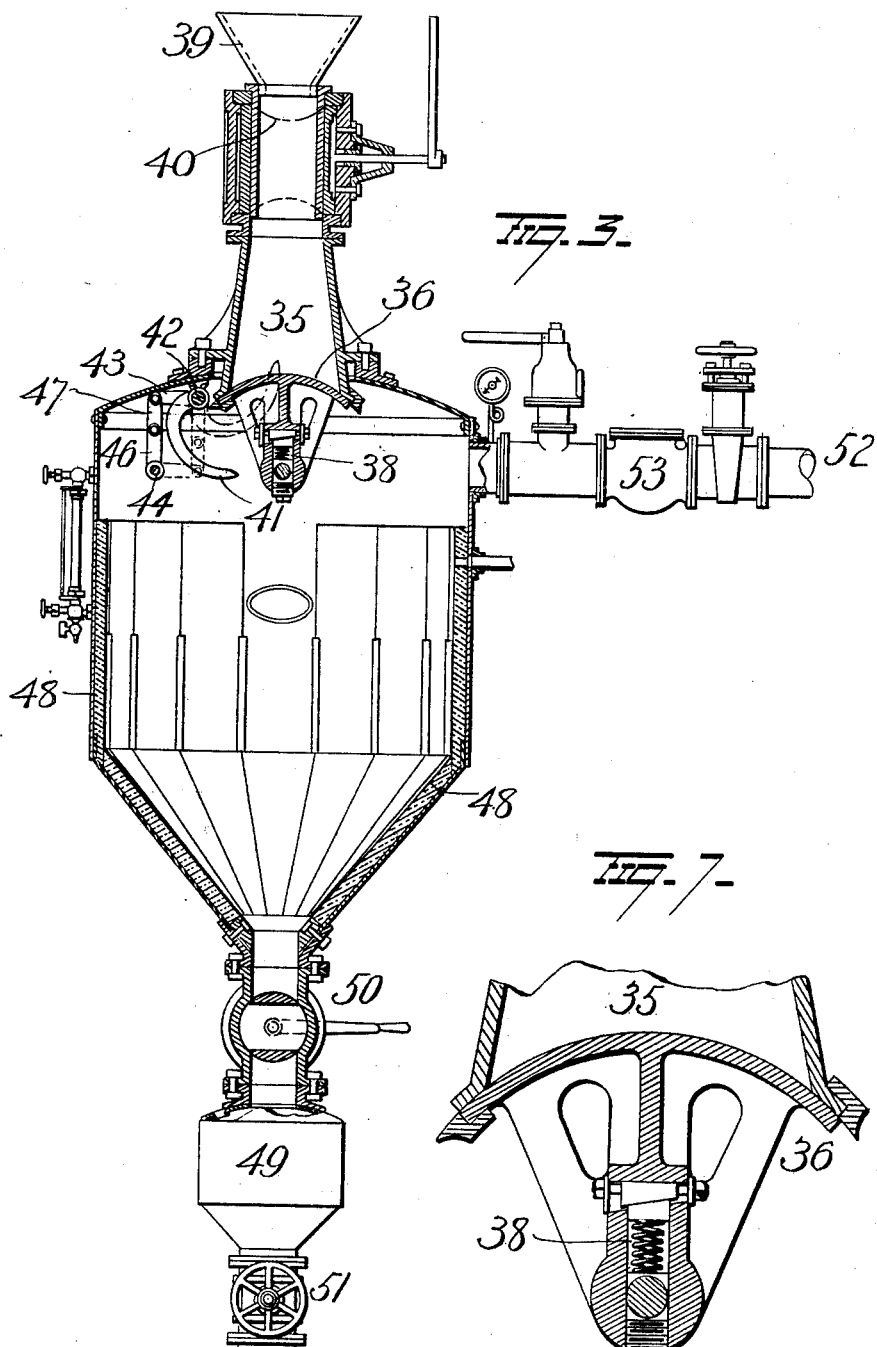

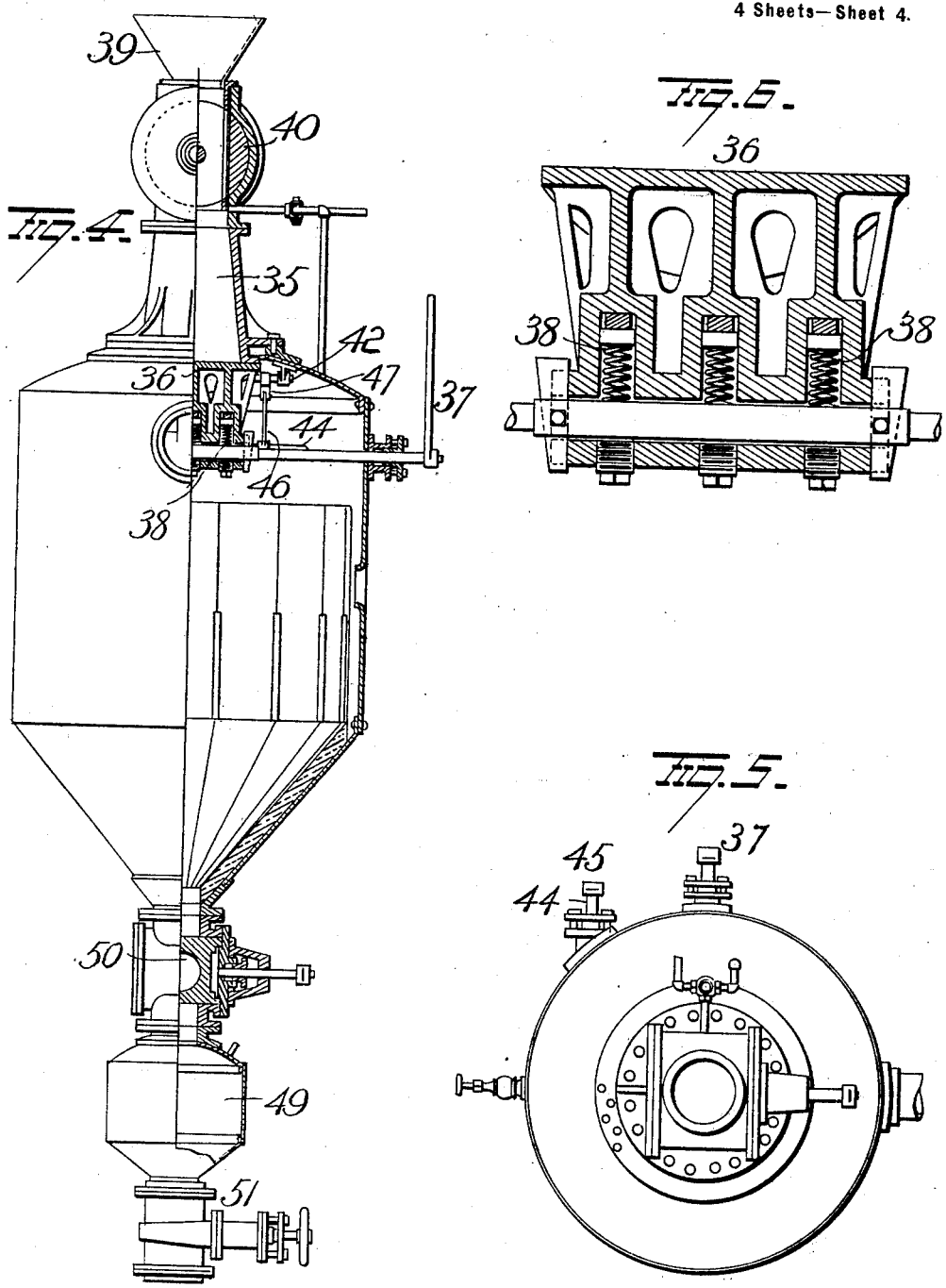

UNITED STATES PATENT OFFICE.

GEORGE MITCHELL, OF NACO, ARIZONA TERRITORY, AND LUCIUS D. COPELAND, OF LOS ANGELES, CALIFORNIA.

PROCESS OF GENERATING STEAM FROM HOT SLAG, &c.

SPECIFICATION forming part of Letters Patent No. 711,333, dated October 14, 1902.

Application filed June 14, 1902. Serial No. 111,742. (No model.)

*To all whom it may concern:*

Be it known that we, GEORGE MITCHELL, of Naco, in the county of Cochise and Territory of Arizona, and LUCIUS D. COPELAND, of Los Angeles, in the county of Los Angeles and State of California, have invented certain new and useful Improvements in Processes of Utilizing Hot Slag; and we do hereby declare the following to be a full, clear, and exact description of the invention, such as will enable others skilled in the art to which it appertains to make and use the same.

Our invention relates to an improved process for generating steam from hot slag or hot refuse produced in blast-furnaces or other metallurgical apparatus.

The object of the invention is to utilize the heat stored in hot slag or other hot refuse produced in metallurgical operations to generate and maintain a constant supply of steam under pressure for use as motive power or other purposes.

A further object is to utilize the heat of hot slag or like hot refuse to generate and maintain a constant supply of steam under pressure and also to granulate the slag, thus transforming it into a condition which will enable it to be economically handled and used.

With these objects in view the invention consists in feeding charges of hot slag into contact with water under pressure contained in a steam-generator adapted to be closed steam-tight while the slag is being fed into and discharged from the generator.

To facilitate a clear understanding of our improved process, it will be explained in connection with different constructions of apparatus for carrying it into effect.

Figure 1:
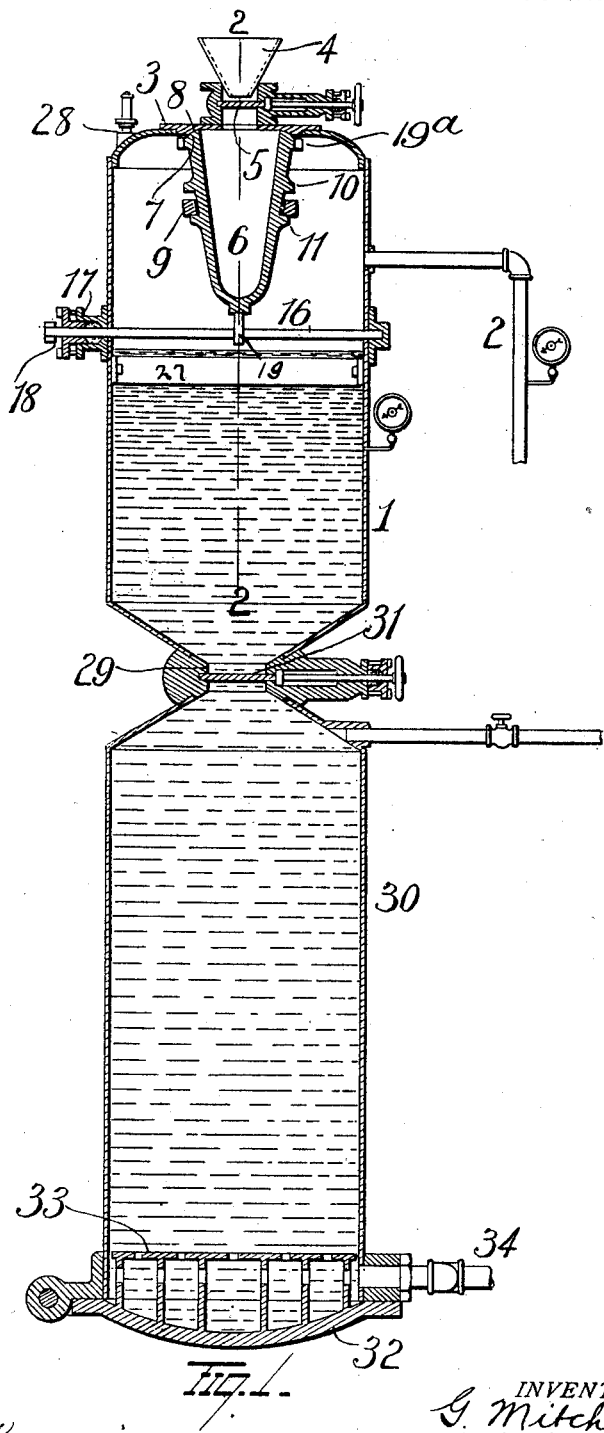
Figure 2:
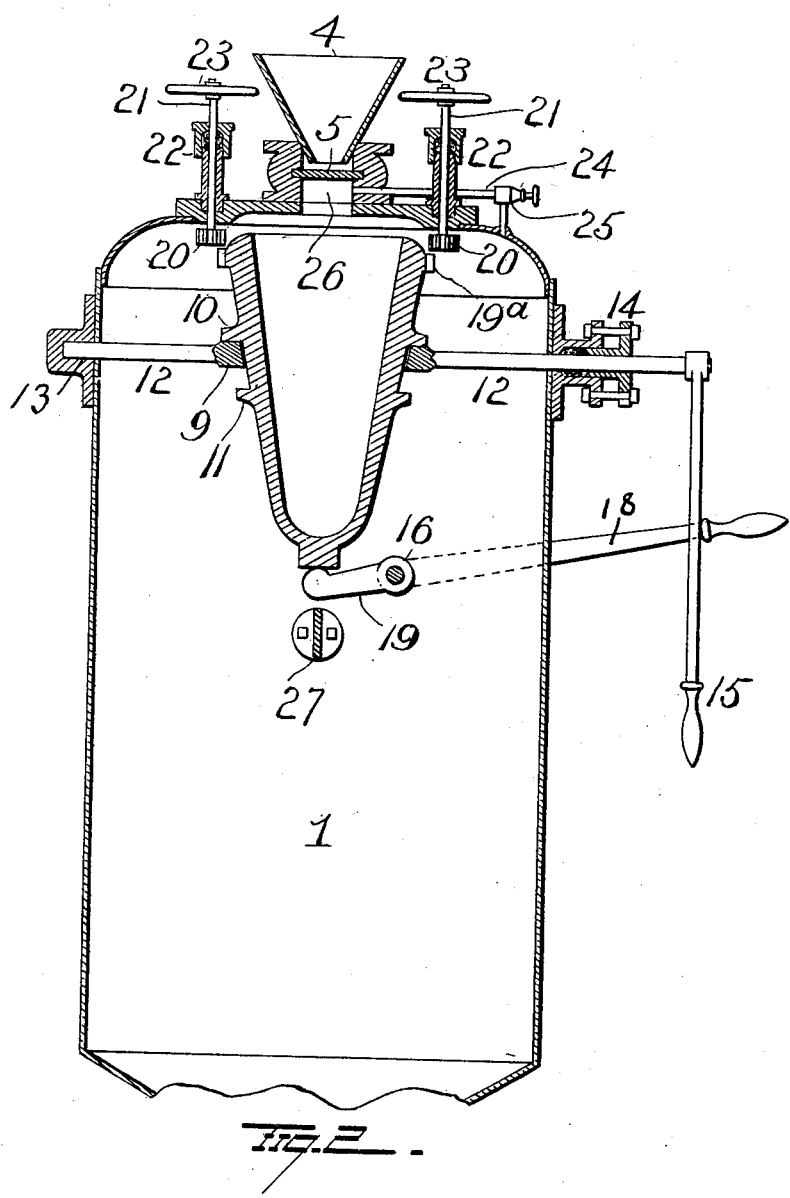

In the accompanying drawings, Figure 1 is a vertical section of one form of apparatus. Fig. 2 is an enlarged vertical section of the upper portion of the apparatus on line 2 2 of Fig. 1. Fig. 3 is a view, partly in vertical section and partly in side elevation, of another form of apparatus. Fig. 4 is a view at right angles to Fig. 3. Fig. 5 is a plan view, and Figs. 6 and 7 are detached views, of the valve.

1 is the shell or casing of a steam-generator, adapted to hold any desired quantity of water to be converted into steam.

2 is a steam-pipe for carrying off steam.

The upper end 3 of the casing is provided with a funnel or hopper 4 for the reception of molten slag and with a slide-valve 5 for controlling its feed.

6 is a slag-receptacle, preferably cone or bell shaped, its upper and open end being provided with a ground-seat 7, which may be seated steam-tight against the seat 8 on the upper end or plate 3. A ring 9 encircles the slag-receptacle and has a limited vertical movement between the upper and lower set of lugs 10 and 11. The ring is furnished with trunnions 12, which are journaled in bearings 13, attached to the shell or casing. One of the trunnions extends through a stuffing-box 14 and is provided at its outer end with a handle 15 for turning the trunnions so as to tilt the ring 9, and with it the slag-receptacle, to discharge the hot slag into the body of water in the generator and for returning the receptacle back into its position for refilling, as indicated in Figs. 1 and 2.

16 is a rock-shaft journaled in trunnions, one end of the shaft extending through a stuffing-box 17 and provided with a handle 18. An arm 19, attached to the rock-shaft, is adapted to engage the under side of the slag-receptacle and lift it and cause its seat 7 to engage the seat 8 and form a steam-tight joint therewith. The spaced lugs 10 and 11 permit of this vertical movement.

The upper end of the slag-receptacle is provided with a gear-wheel $19^a$, which when the receptacle is raised is moved into mesh with pinions 20, carried on the lower ends of shafts 21. These shafts extend through stuffing-boxes 22 and are furnished with hand-wheels 23. When the slag-receptacle is being raised and forced against its seat, it may be rotated by the means described, and any particles of molten slag that may have lodged on the upper end of the slag-receptacle or its seat may be so ground and reduced that the two seats will insure a tight joint and prevent the escape of steam. A steam-pipe 24, provided with a valve 25, leads from the generator into the space 26 below the feed or slide valve 5 and serves to admit steam into the space above the slag-receptacle after it has been filled to equalize the pressure thereon and permit it to be readily lowered from its seat and its contents discharged. The valve 25 allows the steam to be admitted to and cut off from the space above the slag-receptacle. A cross-bar 27 is arranged below the slag-receptacle and serves to break up and divide the charge of hot slag before it reaches the body of water in the generator, and thereby prevent any possibility of an explosion of the slag. A safety-valve 28 is attached to the top of the generator-casing.

The lower end of the generator shell or casing is funnel-shaped and is connected by a conduit 29 with a receiving vessel or receptacle 30, a valve 31, located in the conduit 29, serving to control the discharge of cooled granulated slag from the generator-casing into the lower chamber or receptacle 30. The lower end of this receptacle is provided with a hinged cover 32, which is adapted to be closed steam-tight and is provided with a sieve or perforated plate 33, on which the granulated slag falls and is supported. A pipe 34 is provided for drawing off the water from below the perforated plate 33.

Having described the construction of one suitable construction of apparatus, we will now briefly describe our improved process. The generator casing or shell is partly filled with water, the supply being maintained by any suitable feed-water pump. At the outset all the valves are closed. A charge of hot slag is fed into the funnel or hopper 4. The valve 5 is then opened, and the charge is fed by its gravity into the slag-receptacle 6, and the valve 5 is then closed. Valve 25 is then opened and steam is admitted into the space above the slag-receptacle to equalize the pressure thereon. The slag-receptacle is then tilted and the charge of hot slag is discharged into the body of water, it being divided and broken in its descent by the cross-bar 27. The instant the hot slag comes into contact with the body of water in the generator the slag is granulated, which allows the water to come into direct and intimate contact with the surface of each particle of hot slag, with the result that the heat stored therein is rapidly absorbed by the water, which in turn is quickly transformed into steam. After the slag-receptacle has been tilted and its contents dumped it is turned back to its upright position and raised against its seat, and the operation is repeated as often as may be necessary to maintain a constant supply of steam of any desired volume and pressure. Should the upper end of the slag-receptacle fail to close steam-tight against its seat because of the lodgment of any particles of molten slag on either portion of the seat or for other reasons, the slag-receptacle is rotated and any such obstructions or irregularities of wear are removed or compensated for. The granulated slag that accumulates in the bottom of the generator is discharged therefrom from time to time into the lower chamber or receptacle 30 by opening the valve 31. The granulated slag falls on the perforated plate 33, and from time to time is removed by opening the cover or valve 32, the valve 31 being closed. When the slag is discharged from the generator into the lower chamber, the hot water that is discharged with the slag may be conveyed through pipe 34 to a feed-water heater or tank and be either pumped back into the generator or may be used for other purposes.

By our process the molten slag is fed by its gravity into the generator, where it is granulated and quickly parts with the heat stored therein, and the granulated slag is then discharged by its gravity and is in a condition to be easily handled for any of the many uses for which it is adapted.

The process can be practiced in widely-different forms and conditions of apparatus. Instead of employing an apparatus of the construction hereinbefore described an apparatus of the construction illustrated in Figs. 3 to 7, inclusive, may be employed. In this form of apparatus the slag-receptacle 35 is stationary, its lower end projecting into the generator-casing and provided with an oscillating valve 36, which is operated by a handle 37. Springs 38 are interposed between the valve and rock-shaft and serve to hold the valve against its seat and compensate for any wear. A hopper or funnel 39 communicates with the upper end of the slag-receptacle, and a rotary valve 40 controls the discharge of molten slag for the hopper into the slag-receptacle. 41 is a drift-hook secured at one end to a rock-shaft 42, which is provided with a rigid arm 43. A second rock-shaft 44 extends through the casing and has a handle 45 attached to its outer end. Rock-shaft 44 has a rigid arm 46, which is connected to arm 43 by means of a link 47. By actuating the handle 45 the drift bar or hook may be moved into and out of the lower end of the slag-receptacle when the valve 36 is open and discharge any slag that may have become clogged thereon. 48 represents removable lining-sections, which serve to protect the generator-casing from being quickly worn away by the slag as it is fed downwardly through the generator. A discharge-chamber 49 is connected to the bottom of the generator, a rotary valve 50 being provided for controlling the discharge of slag from the generator into such chamber and another valve 51 controls the discharge of slag from the chamber. The steam pipe 52 may supply steam to any suitable boiler or receptacle and is provided with a check-valve 53 to prevent the return of steam to the generator in the event the pressure in the generator should fall below the pressure in such boiler or receptacle.

As it is evident that our process may be practiced in widely different forms and constructions of apparatus we would have it understood that our invention is in no wise restricted to the employment of any particular form or construction of apparatus.

Having fully described our invention, what we claim as new, and desire to secure by Letters Patent, is—

1. The process of generating a constant supply of steam under pressure from the heat contained in hot slag, consisting in feeding charges of hot slag by its gravity into contact with water confined under pressure in a steam-generator adapted to be closed steam-tight while the slag is being fed into the water and discharged therefrom, substantially as set forth.

2. The process of generating a constant supply of steam under pressure from the heat contained in hot slag, consisting in intermittingly feeding charges of hot slag by its gravity into a body of water confined under pressure in a steam-generator adapted to be closed steam-tight while charges of slag are being fed into the body of water and discharged therefrom, substantially as set forth.

3. The process of generating a constant supply of steam under pressure from the heat contained in hot slag, and granulating the slag, consisting in intermittingly feeding charges of hot slag by its gravity into water confined under pressure in a steam-generator adapted to be closed steam-tight while charges of slag are being fed into the water and discharged therefrom and in intermittingly discharging granulated slag from such confined body of water, substantially as set forth.

4. The process of generating a constant supply of steam under pressure from the heat contained in hot slag, consisting in intermittingly feeding hot slag by its gravity into a body of water confined under pressure in a steam-generator adapted to be closed steam-tight while charges of slag are being fed into the water and discharged therefrom, and intermittingly discharging granulated slag by its gravity from such confined body of water, substantially as set forth.

In testimony whereof we have signed this specification in the presence of two subscribing witnesses.

GEORGE MITCHELL.
LUCIUS D. COPELAND.

Witnesses:
S. G. NOTTINGHAM,
A. W. BRIGHT.